(12) United States Patent
Kim

(10) Patent No.: US 12,394,780 B2
(45) Date of Patent: Aug. 19, 2025

(54) NON-WOVEN-TYPE ORGANIC ELECTRODE AND STRETCHABLE BATTERY USING SAME

(71) Applicant: Swemeka, Cheongju-si (KR)

(72) Inventor: Jae Kwang Kim, Cheongju-si (KR)

(73) Assignee: Swemeka, Cheongju-si (KR)

( * ) Notice: Subject to any disclaimer, the term of this patent is extended or adjusted under 35 U.S.C. 154(b) by 0 days.

(21) Appl. No.: 17/544,711

(22) Filed: Dec. 7, 2021

(65) Prior Publication Data

US 2023/0069652 A1 Mar. 2, 2023

(30) Foreign Application Priority Data

Aug. 26, 2021 (KR) .................. 10-2021-0113327

(51) Int. Cl.
| | |
|---|---|
| *H01M 4/137* | (2010.01) |
| *H01M 4/02* | (2006.01) |
| *H01M 4/60* | (2006.01) |
| *H01M 10/0565* | (2010.01) |
| *H01M 50/121* | (2021.01) |
| *H01M 50/131* | (2021.01) |

(52) U.S. Cl.
CPC .......... *H01M 4/137* (2013.01); *H01M 4/602* (2013.01); *H01M 10/0565* (2013.01); *H01M 50/121* (2021.01); *H01M 50/131* (2021.01); *H01M 2004/021* (2013.01); *H01M 2300/0082* (2013.01); *H01M 2300/0085* (2013.01)

(58) Field of Classification Search
CPC .. H01M 4/137; H01M 4/602; H01M 10/0565; H01M 50/121; H01M 50/131; H01M 2004/021; H01M 2300/0082; H01M 2300/0085; H01M 2004/028; H01M 4/587; H01M 4/1399; H01M 4/604; H01M 4/608; H01M 4/622; H01M 4/623; H01M 4/625; H01M 10/0525; H01M 10/0585; H01M 50/136; Y02E 60/10; Y02P 70/50

See application file for complete search history.

(56) References Cited

U.S. PATENT DOCUMENTS

| | | | |
|---|---|---|---|
| 2002/0076610 A1* | 6/2002 | Morioka | .................. H01M 4/60 |
| | | | 429/213 |
| 2016/0315352 A1* | 10/2016 | Jiang | .................... H01M 50/119 |

FOREIGN PATENT DOCUMENTS

| | | | | |
|---|---|---|---|---|
| GB | 2399938 | * | 9/2004 | ............. H01M 4/60 |
| JP | 2004-348977 | * | 12/2004 | ............. H01M 2/10 |
| KR | 10-2016-0129440 A | | 11/2016 | |
| KR | 10-2238115 B1 | | 4/2021 | |

OTHER PUBLICATIONS

What is the difference between current collector and electrode? SSNTM web page, Jun. 15, 2023, Foshan Sino Science Nano Technology Material Co., Ltd., FoshanCity, China, https://www.ssntm.com/blog/.

Yaxiang Yu et al, Research and development of advanced battery materials in China, Energy Storage Materials, 2019, vol. 23, pp. 144-153, Elsevier, Amsterdam, Netherlands.

* cited by examiner

*Primary Examiner* — Helen Oi K Conley

(74) *Attorney, Agent, or Firm* — STIP Law Group, LLC

(57) ABSTRACT

The present disclosure relates to an organic electrode manufactured into a non-woven type by using an electro-spin method, a stretchable battery which is stretchable and shrinkable, utilizing same, and a method of manufacturing the battery.

10 Claims, 11 Drawing Sheets

NON-WOVEN-TYPE ORGANIC ELECTRODE AND STRETCHABLE BATTERY USING SAME

This application claims priority to Korean Patent Application No. 10-2021-0113327, filed on Aug. 26, 2021, the contents of which are all hereby incorporated by reference herein in their entirety.

BACKGROUND

The present disclosure relates to an organic electrode formed into a non-woven type, a stretchable battery utilizing same, which is stretchable and shrinkable, and a method of manufacturing the battery.

Recently, according to the development of sensors for healthcare and sensing the changes in the human body, portable medical device market grows rapidly. Particularly, according to the increase on the demands of portable medical devices which could be installed on the body, the demands on a lithium ion secondary battery as an energy source which is capable of supplying power, grow rapidly.

Most lithium ion secondary batteries used nowadays include cylindrical, prismatic and pouch-type secondary batteries. The lithium ion secondary batteries are classified into a pouch type, a cylindrical and a prismatic type according to the type of exterior materials. The lithium ion secondary batteries are manufactured by installing an electrode assembly composed of an anode, a cathode and a separator in a metal can of cylindrical or prismatic type or a pouch-type case of an aluminum laminate sheet, and injecting an electrolyte into the electrode assembly, and there are advantages in that the manufacturing thereof is easy, and the manufacturing cost is low. However, there are disadvantages in that the change of the shape is limited in the case where a certain space for installing a lithium ion secondary battery is essentially required. Accordingly, for the lithium ion secondary batteries of a cylindrical, prismatic or pouch type have defects acting as a constraint on the development of portable devices with various shapes, and secondary batteries with a novel and easily changeable shape are required.

In this regard, for the manufacture of a secondary battery with an easily changeable shape, i.e., a flexible battery, the biggest problem is the breaking of a conductive layer in the process of stretching of an electrode and reducing conductivity to deteriorate electrochemical properties. Accordingly, though a battery is changed, it is necessary to secure the electrochemical performance always constant according to the changed state (for example, stretchable and shrinkable). The conventionally used secondary batteries, mainly, lithium ion secondary batteries could be manufactured in changeable forms by using an inorganic electrode material, but there are limits in manufacturing lithium ion secondary batteries which are stretchable and shrinkable and secure constant electrochemical performance.

PRIOR ART DOCUMENT

Patent Document (Patent Document 0001) Korean Patent No.: 10-2017-0072703 (publication date: Jun. 27, 2017)

SUMMARY

The present disclosure is designed to solve the above-described defects, and the present disclosure is complected by confirming constant electrochemical properties during stretching and shrinking a battery in case of manufacturing a non-woven-type electrode by using an electro-spin method of an organic polymer material, and using thereof in the battery.

Accordingly, an object of the present disclosure is to provide a stretchable battery which may secure constant electrochemical properties even stretching and shrinking the battery.

Another object of the present disclosure is to provide a lithium secondary battery including the non-woven-type electrode.

To solve the above-described technical tasks, the present disclosure has the configurations below.

A stretchable battery for solving the technical tasks of the present disclosure is characterized in forming a non-woven type electrode using an organic polymer active material which is capable of performing electrochemical oxidation-reduction reaction, by an electro-spin method.

The organic polymer active material included in the electrode of the stretchable battery for solving the technical tasks of the present disclosure is preferably characterized in being a polymer of nitroxyl radical and conjugated carbonyl as the active material of the electrode.

The organic polymer active material of the stretchable battery for solving the technical tasks of the present disclosure is characterized in being included in a range of 30 wt % to 90 wt %, preferably, 40 wt % to 80 wt % based on the total mass of the electrode.

The stretchable battery for solving the technical tasks of the present disclosure is characterized in using a non-woven-type electrode manufactured by an electro-spin method after mixing the organic polymer active material, a polymer binder, and a carbon conductive agent.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, the present disclosure will be explained in detail referring to embodiments and drawings.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Figure 1:
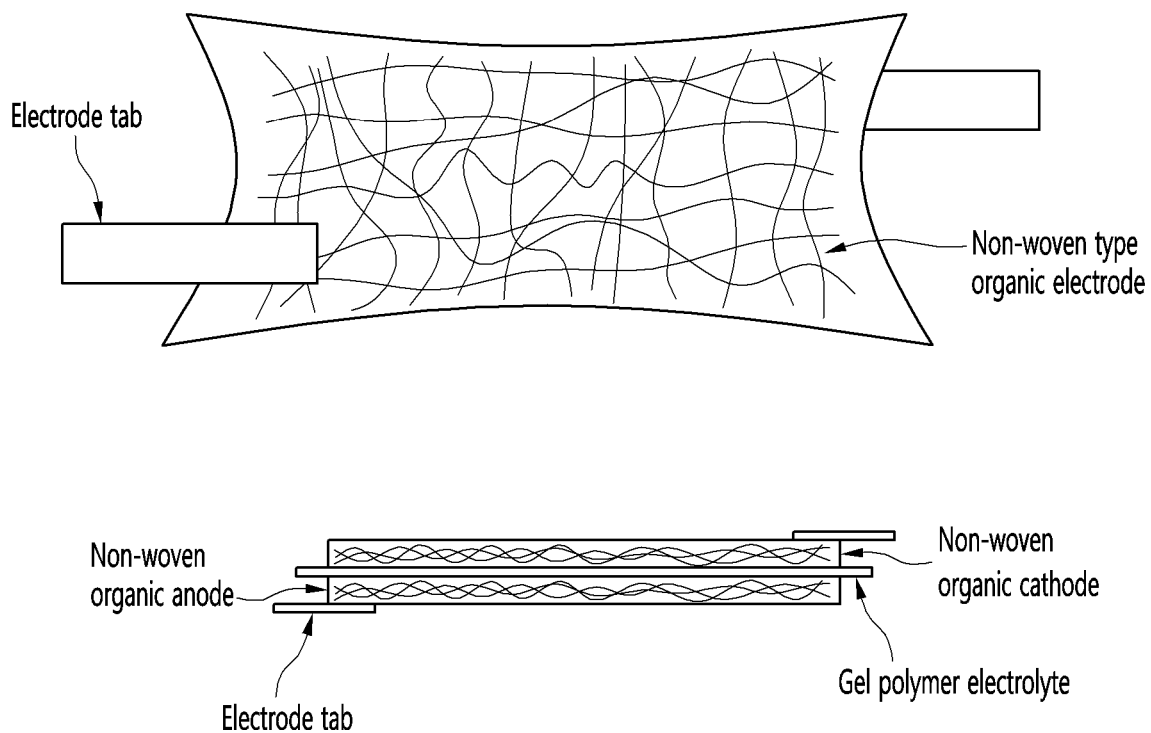
FIG. 1 is a structure diagram of a stretchable battery composed of a non-woven-type organic electrode and a gel polymer electrolyte.

FIG. 1 is a structure diagram of a stretchable battery composed of a non-woven-type organic electrode including an organic polymer active material and a gel polymer electrolyte, and hereinafter, the explanation will be taken based thereon.

In an embodiment of the present disclosure, the non-woven-type electrode is characterized in being an electrode (cathode, anode) manufactured by mixing an organic polymer active material, a carbon-based conductive agent and a polymer binder with a solvent and through an electro-spin method.

In the present disclosure, the electro-spin method refers to a process of spinning a polymer fiber like a thread through a process of applying an electric field to a polymer mixture solution. In an embodiment of the present disclosure, the voltage of the electric field used in the electro-spin method is 10 to 30 kV, preferably, 15 to 20 kV.

In an embodiment of the present disclosure, the organic polymer active material included in the non-woven electrode is a conductive polymer.

The conductive polymer may include an aromatic carbon ring.

The conductive polymer may include one or more selected from the group consisting of organic polymers having a structure of conjugated hydrocarbon, conjugated amine, conjugated thioether, organodisulfide, thioether, nitroxyl radical, conjugated carbonyl, and sulfonyloxy radical, and derivatives thereof.

The conductive polymer may preferably include one or more selected from the group consisting of organic materials having a nitroxyl radical, conjugated carbonyl, quinone, or anhydride structure, and derivatives thereof.

The organic material is contained in the active material of an electrode in the present disclosure, and an organic polymer-containing electrode may be manufactured.

By using a conductive polymer of not an inorganic material but an organic material, as the active material of the electrode, an electrode may be manufactured by a cost-effective method without a baking process at a high temperature. Further, there are advantages of diversely changing electrochemical properties through structural deformation (for example, the substituent deformation of a conjugated structure responsible for oxidation/reduction) based on the flexibility of an organic material itself.

Meanwhile, in an embodiment of the present disclosure, the carbon-based conductive agent mixed with the organic polymer active material is one or more carbon-based materials selected from the group consisting of active carbon, graphene, carbon nanotube, acetylene carbon black, amorphous carbon, natural graphite, synthetic graphite, carbon black, ketjen black, and vapor-grown carbon fiber (VGCF).

In the present disclosure, the binder mixed with the organic polymer active material organically connects active materials to increase the cohesion therebetween, and may use a fluorine resin-based binder including polyvinylidene fluoride (PVdF) or polytetrafluoroethylene (PTFE); a rubber-based binder including styrene butadiene rubber (SBR), acrylonitrile-butadiene rubber, and styrene-isoprene rubber; a cellulose-based binder including carboxyl methyl cellulose (CMC), starch, hydroxypropyl cellulose, and regenerated cellulose; a poly alcohol-based binder; a poly olefin-based binder including polyethylene and polypropylene; a poly amide-based binder; a poly ester-based binder; a polyvinyl chloride-based binder including polyvinyl chloride and carboxylated polyvinyl chloride; a silane-based binder, a polyurethane-based binder, ethylene oxide, an epoxy resin and nylon, mixtures of one or more selected therefrom, or copolymers thereof.

In an embodiment of the present disclosure, after mixing the above-described organic polymer active material, carbon-based conductive agent and polymer binder with a solvent, a non-woven-type electrode is manufactured using an electro-spin method, and the non-woven-type cathode thus manufactured, an anode and a gel polymer electrolyte are combined to manufacture a stretchable battery.

Here, the solvent according to an embodiment of the present disclosure is characterized in being N-methyl-2-pyrrolidone (NMP), acetone or a mixture solvent obtained by mixing them in a specific ratio, and is sufficient as long as it dissolves the organic polymer active material, the binder and the conductive agent, without limitation.

Figure 6:
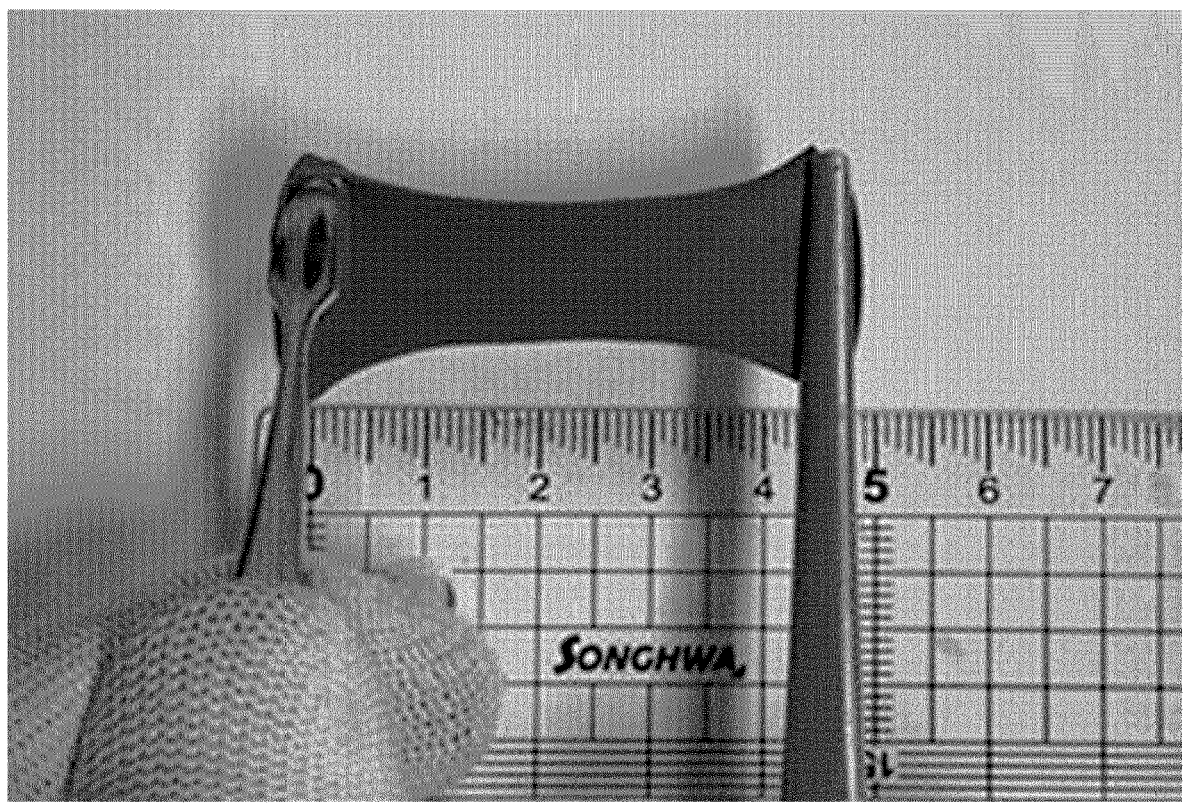
FIG. 6 is an image showing a stretched state of a non-woven-type organic electrode manufactured using PTNB.
Figure 7:
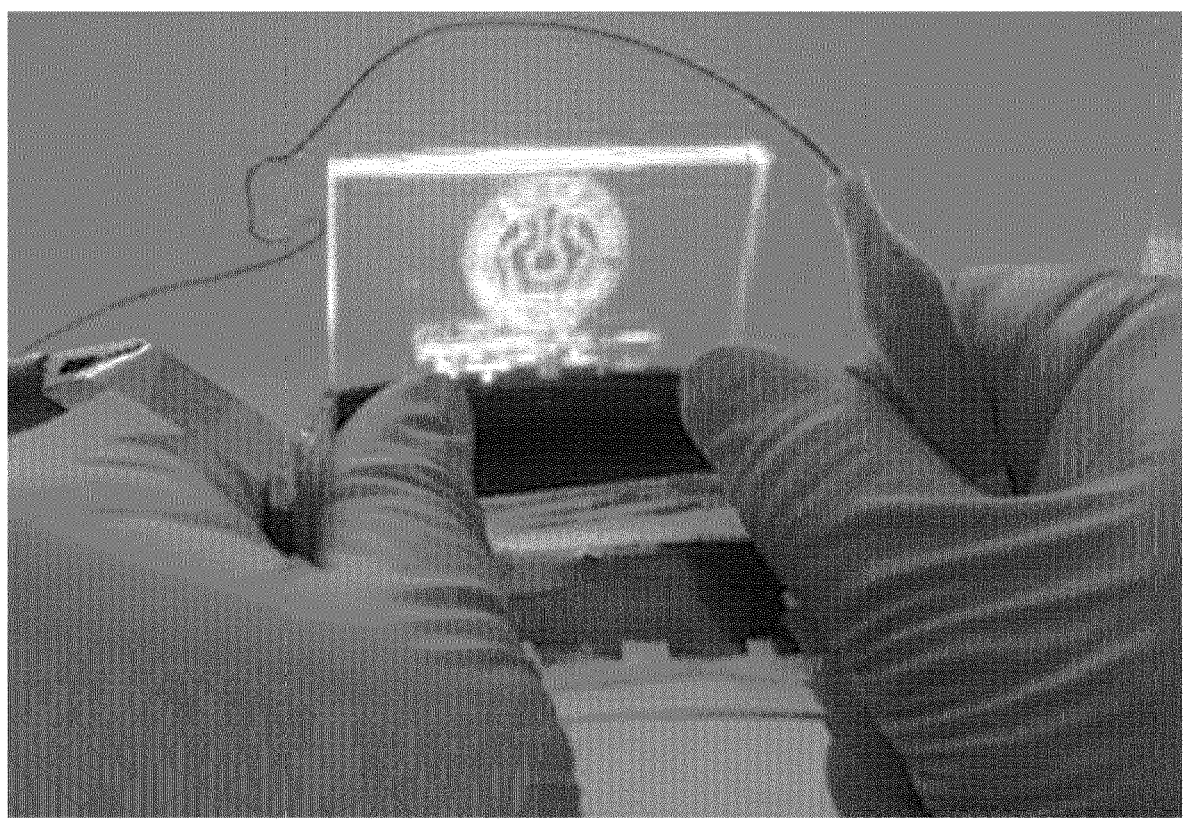
FIG. 7 is an image showing a stretched state of a stretchable battery composed of a non-woven-type cathode manufactured using PTNB, a graphite anode and a gel polymer electrolyte.
Figure 8:
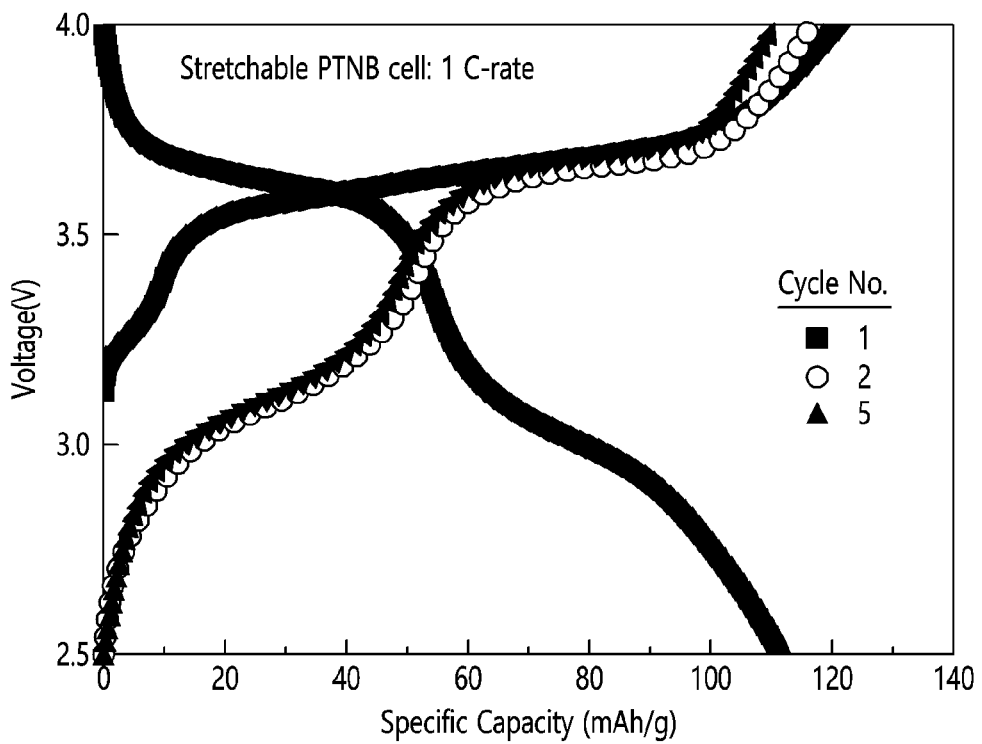
FIG. 8 shows a charge and discharge curve (up) and a life performance graph (down) of a stretchable battery manufactured in Example 1. It could be confirmed that, if evaluated at a high current density of 1 C-rate, the battery of Example 1 showed a reversible capacity of about 112 mAh/g and stably maintained life up to 50 cycles.
Figure 8:
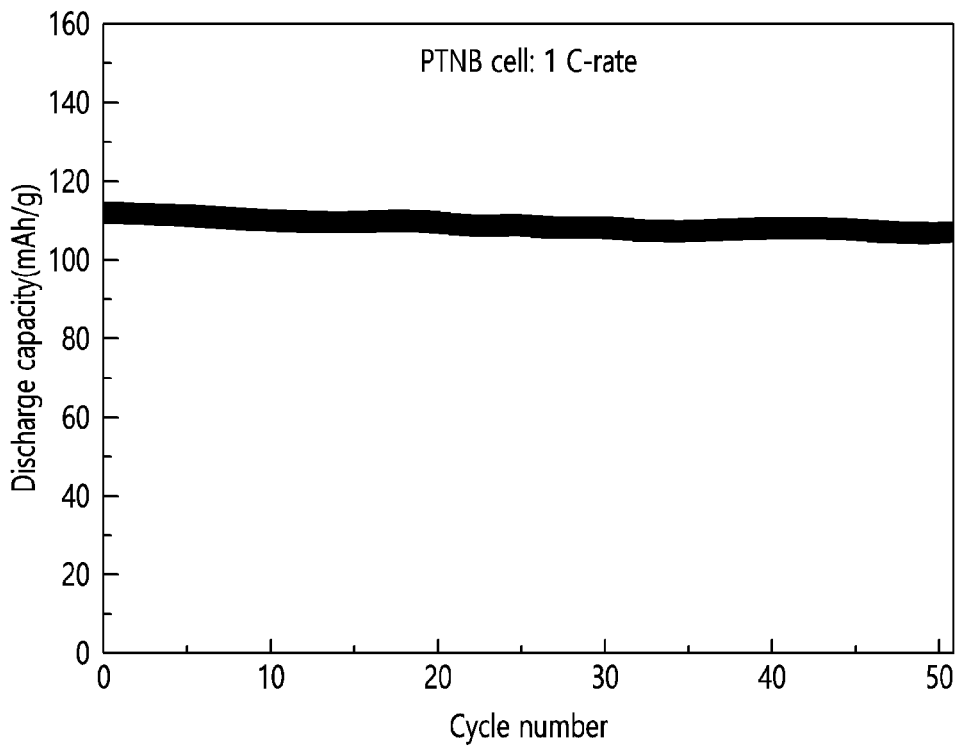
Figure 9:
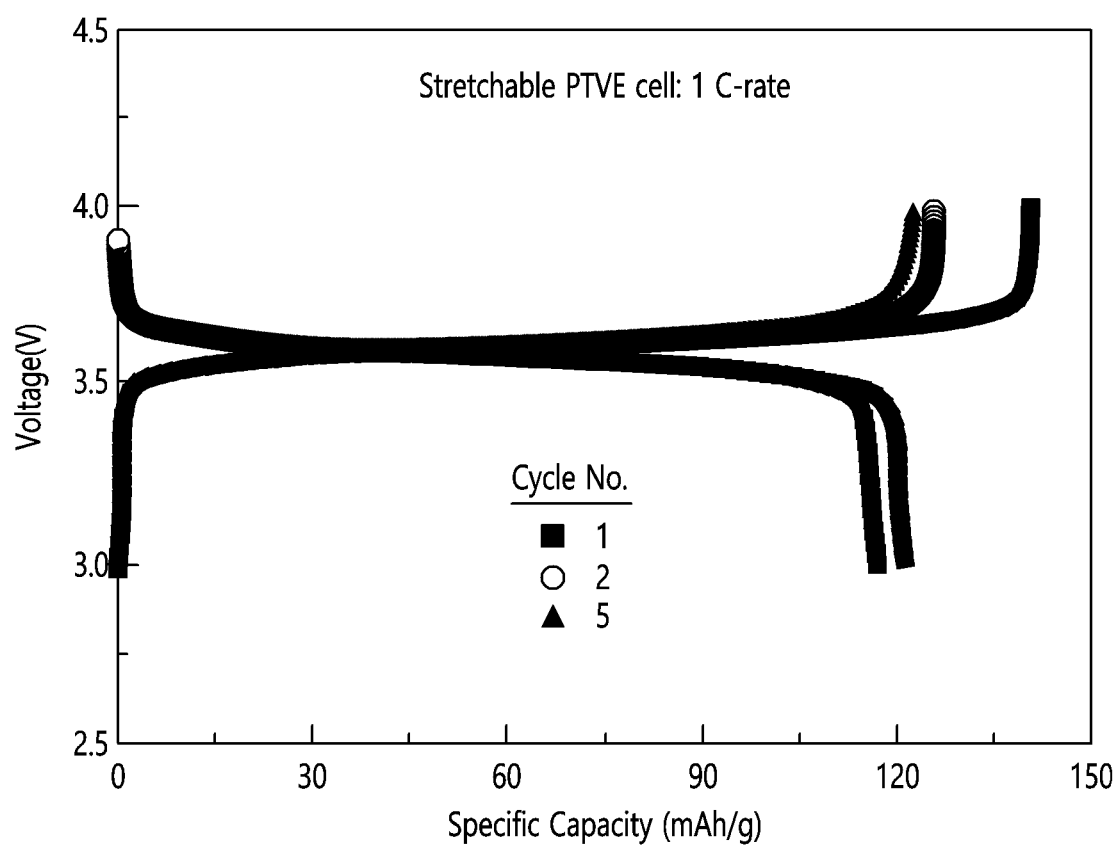
FIG. 9 shows a charge and discharge curve of a stretchable battery manufactured in Example 2. If evaluated at a high current density of 1 C-rate, the battery of Example 2 showed a reversible capacity of about 120 mAh/g.
Figure 10:
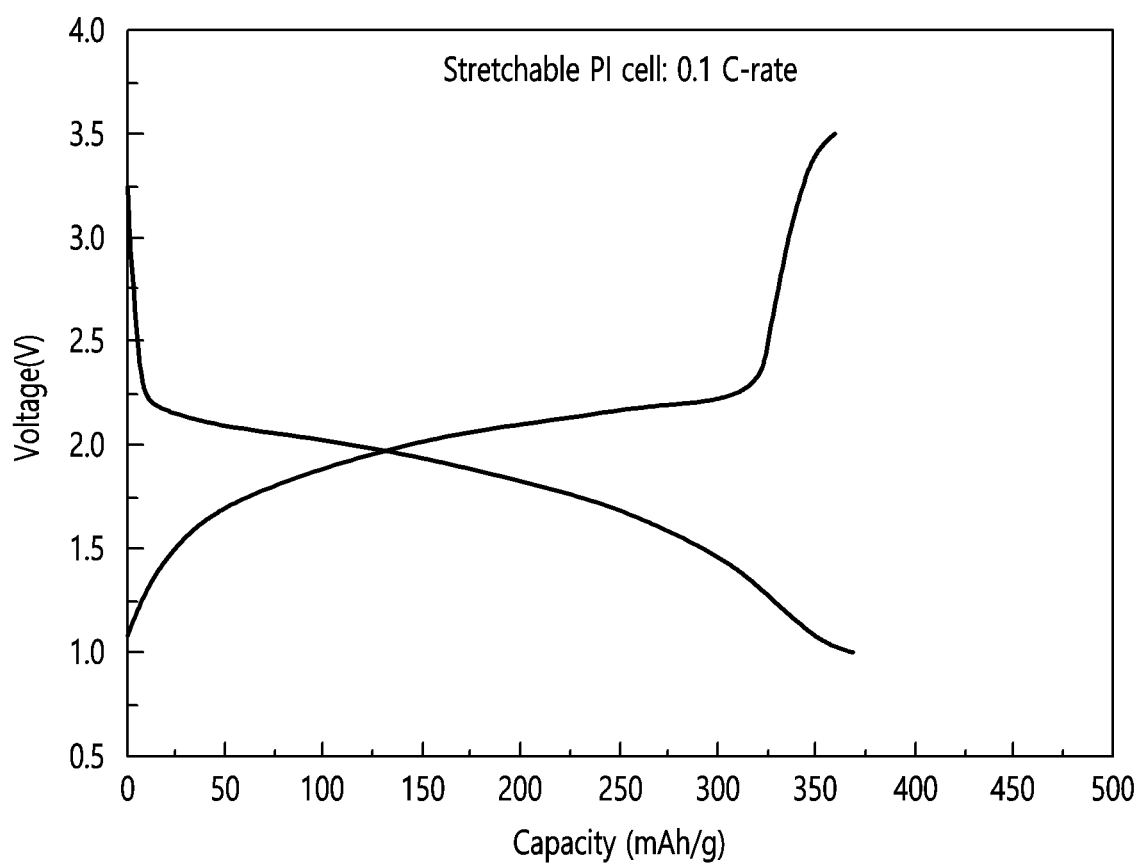
FIG. 10 shows a charge and discharge curve of a stretchable battery manufactured in Example 3. The battery of Example 3 showed a discharge capacity of greater than 350 mAh/g at a current density of 0.1 C.
Figure 11:
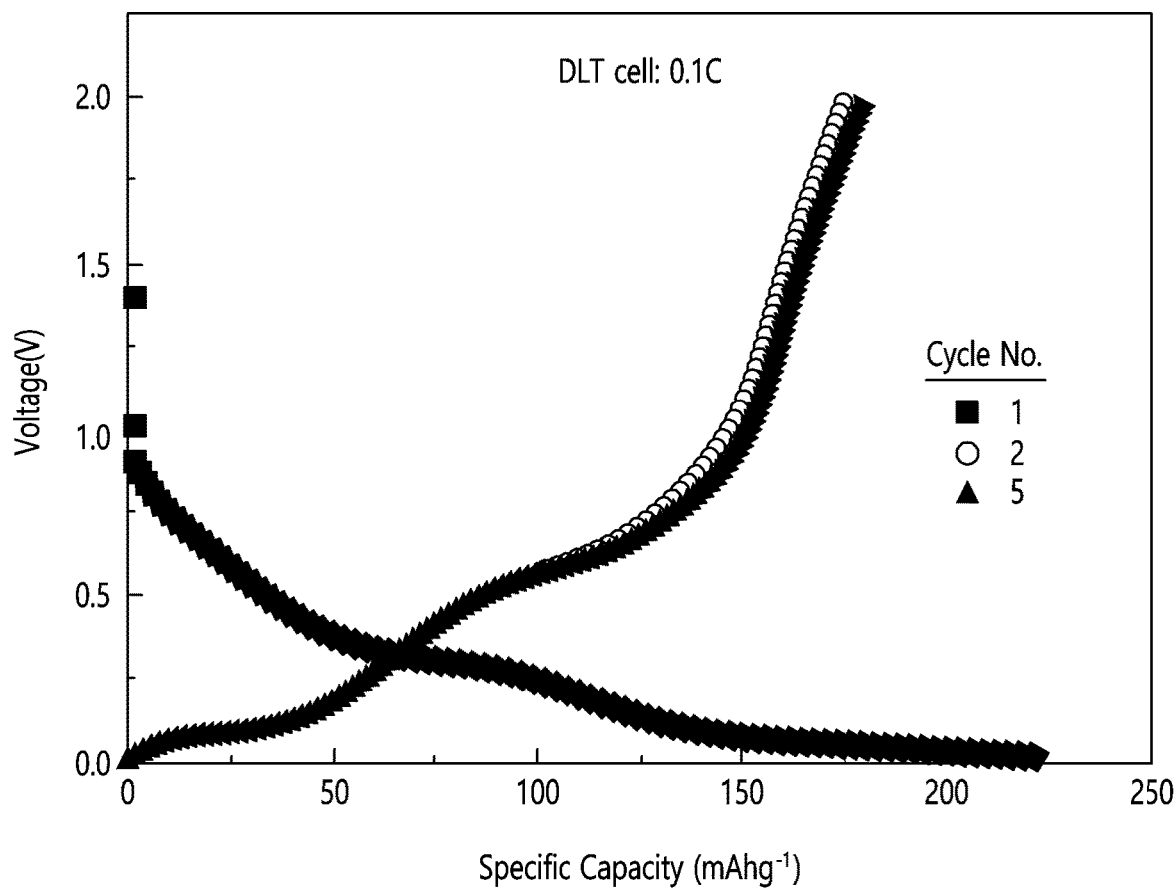
FIG. 11 shows a charge and discharge curve of a stretchable battery manufactured in Example 4. The battery of Example 4 showed a charge capacity of greater than 230 mAh/g at a current density of 0.1 C.

The non-woven type is well-known to effectively disperse stress applied to an electrode while bending or folding (see FIG. 6). By employing such a non-woven-type electrode configuration, an electrode with excellent flexural characteristics and rate-capability may be manufactured. In addition, if a non-woven fabric is utilized as an electrode, a three-dimensionally well-developed electricity transfer path and an even broader electrode surface area could be secured, and such properties may be reflected on the rate-capability of a battery.

Meanwhile, the features of the gel polymer electrolyte used in the stretchable battery of the present disclosure are as follows.

Figure 2:
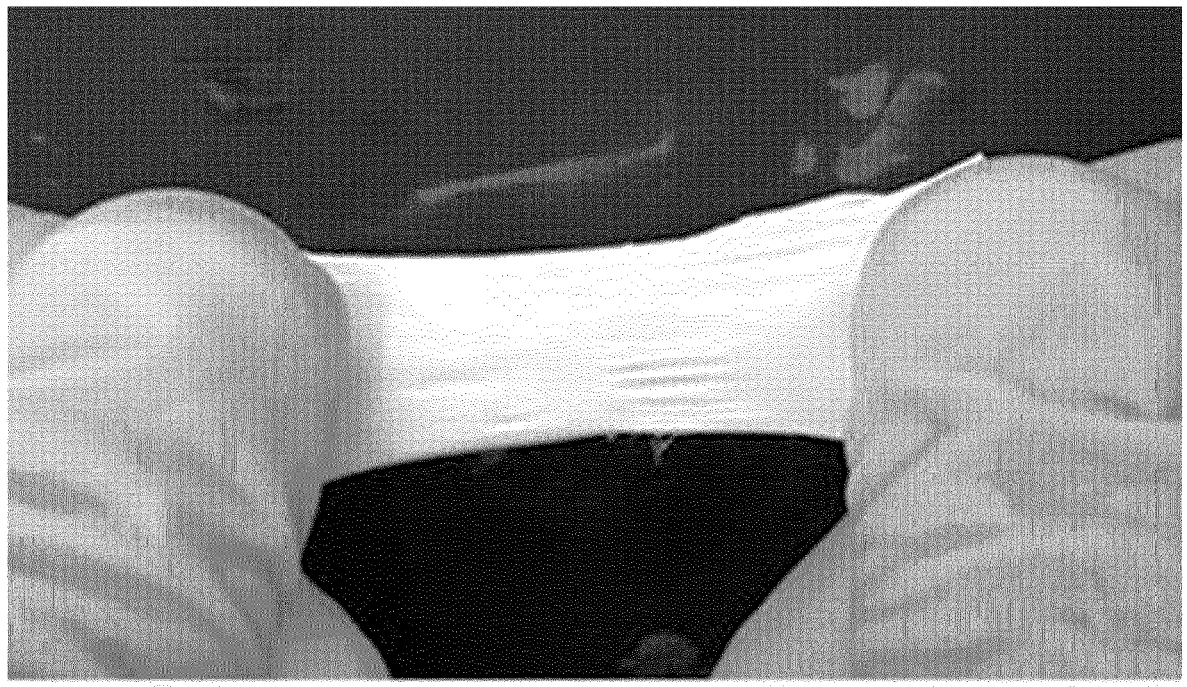
FIG. 2 shows images of a gel polymer electrolyte formed by an electro-spin method (up) and a solution casting method (down)
Figure 2:
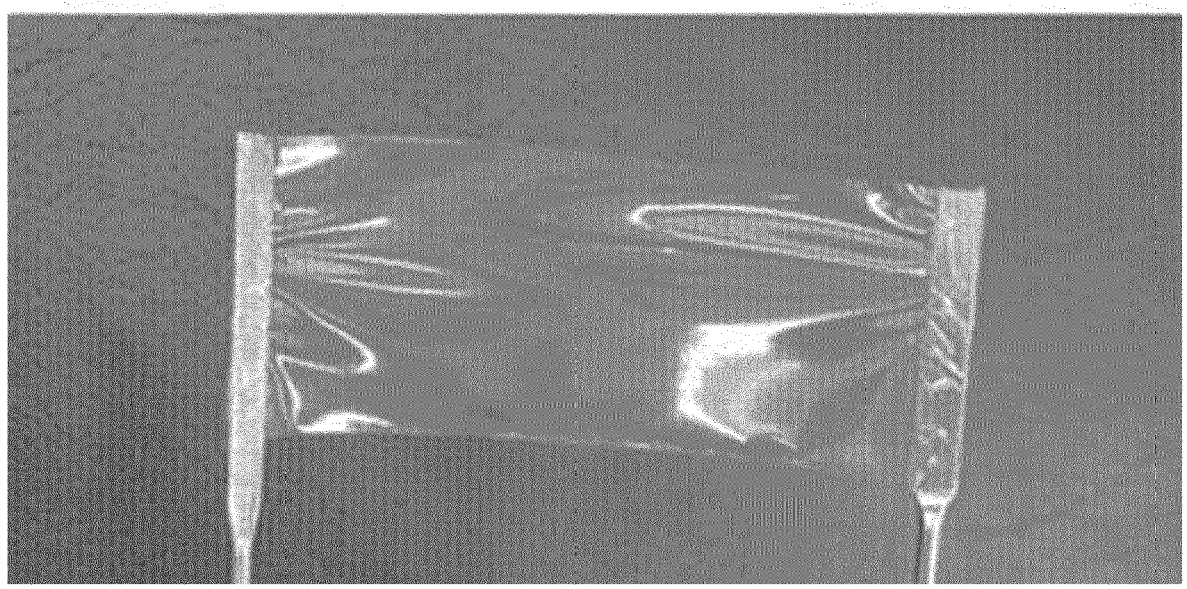

FIG. 2 shows images of a gel polymer electrolyte formed by an electro-spin method and/or a solution casting method according to an embodiment of the present disclosure. The gel polymer electrolyte is formed by dissolving a polymer in a solvent, electro-spinning or solution casting, drying to form a polymer film, and impregnating a liquid electrolyte.

In an embodiment of the present disclosure, the gel polymer electrolyte is a gel polymer electrolyte having flexibility, and the gel polymer electrolyte is formed by manufacturing a polymer film using PVdF-HFP as a polymer, and impregnating a liquid phase electrolyte obtained by mixing a certain amount of a lithium salt and an organic solvent.

Figure 3:
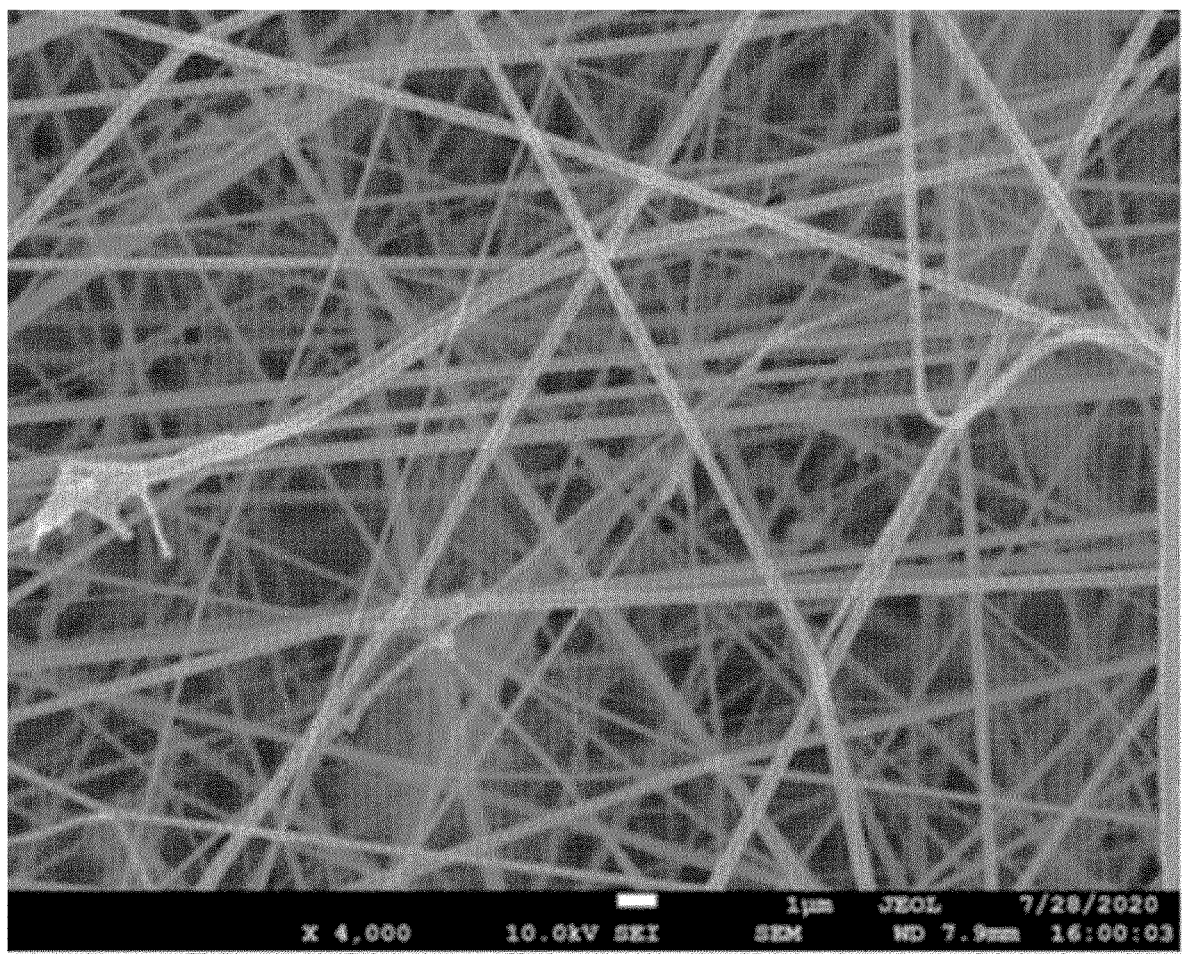
FIG. 3 is a SEM image of a non-woven-type electrode manufactured by using an organic polymer active material of poly[2,3-bis(2,2,6,6-tetramethylpiperidine-N-oxycarbonyl)-norbornene (PTNB) of Formula 1.
Figure 4:
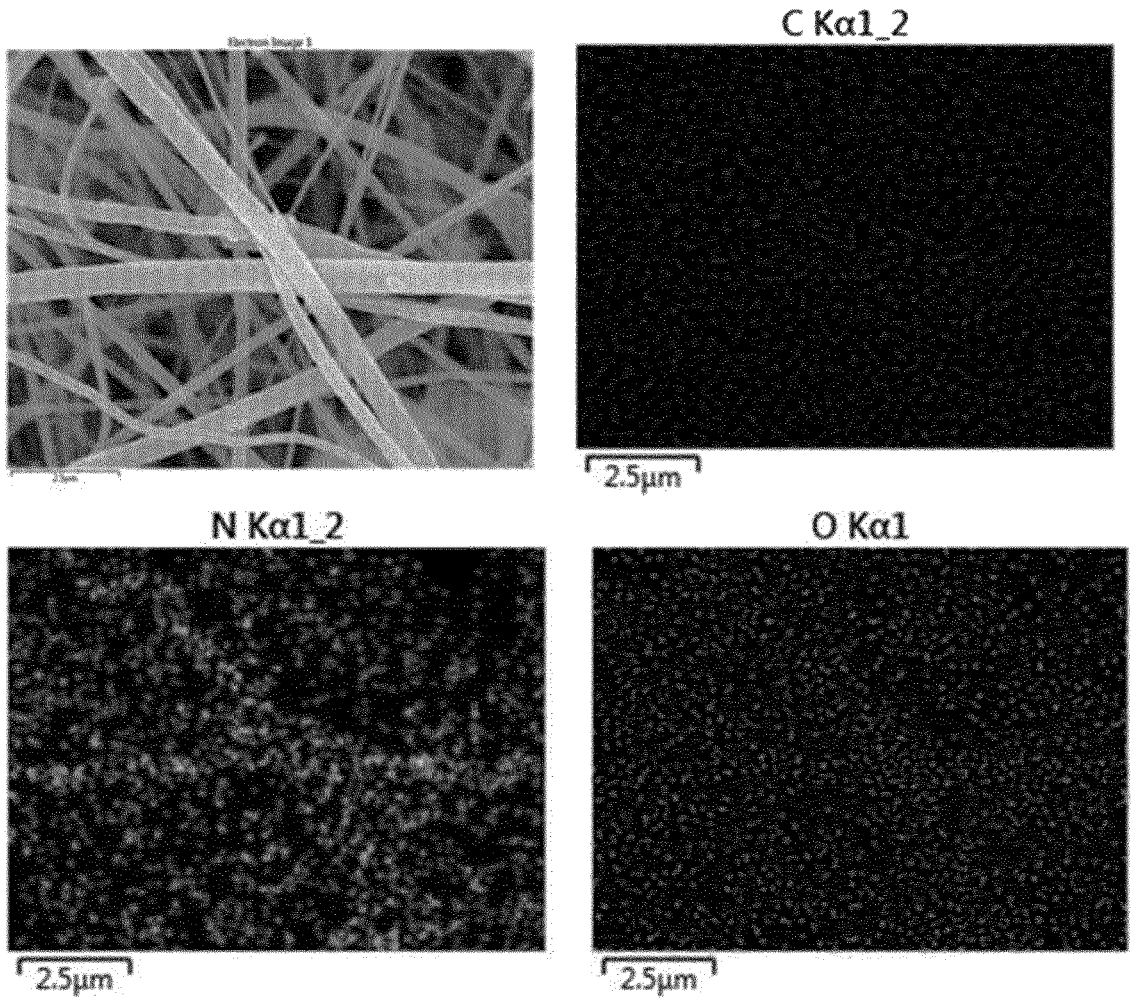
FIG. 4 shows SEM images and EDS elemental analysis results of a non-woven-type electrode manufactured by using an organic polymer active material of poly[2,3-bis(2,2,6,6-tetramethylpiperidine-N-oxycarbonyl)-norbornene (PTNB) of Formula 1.
Figure 5:
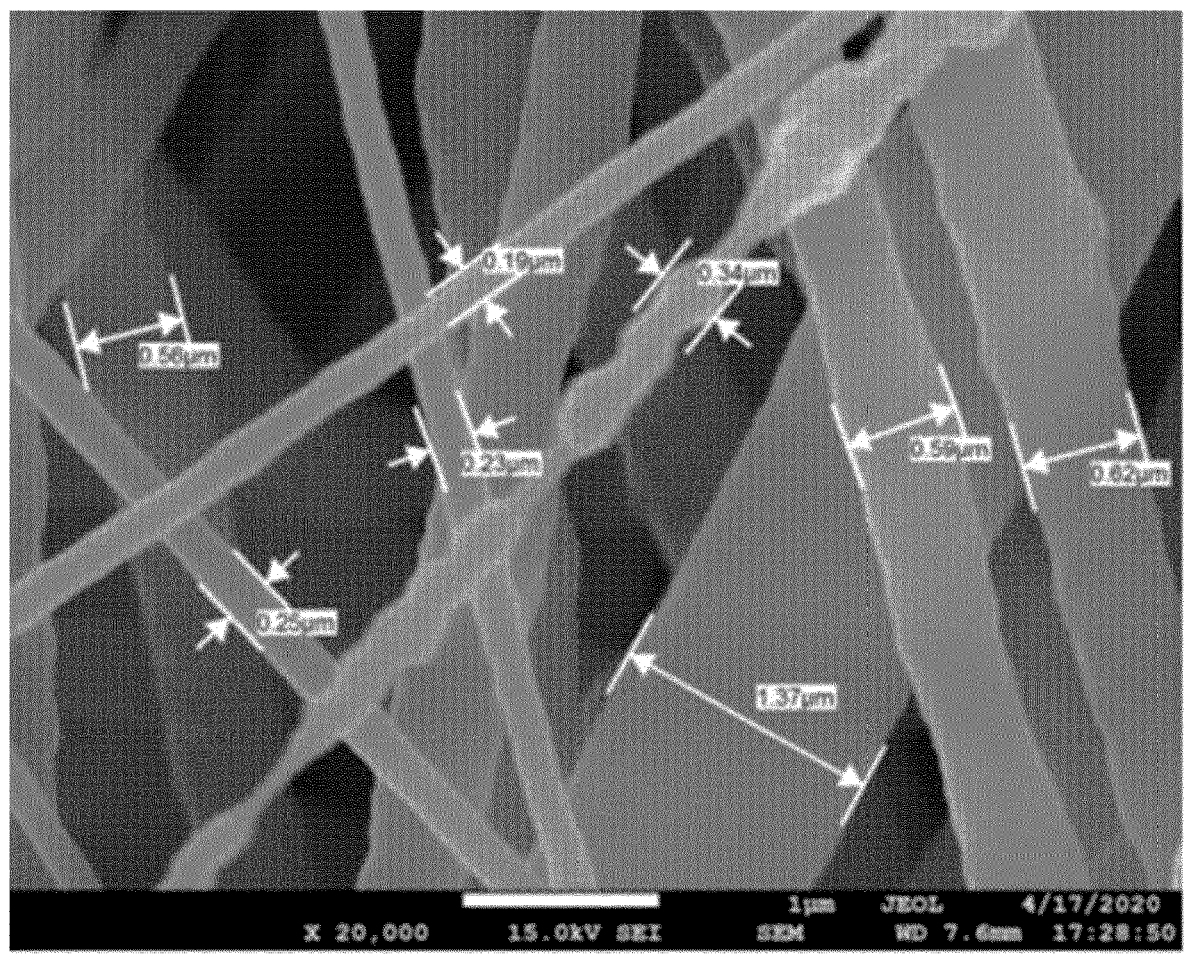
FIG. 5 is a SEM image of a non-woven-type electrode manufactured by using an organic polymer active material of poly(2,2,6,6-tetramethylpiperidine-4-yl-1-oxyl vinyl ether) (PTVE) of Formula 2.

In an embodiment of the present disclosure, the polymer film manufactured by an electro-spin method shows a non-woven type in which fibers with a micrometer size are crossed like a net, and the gel polymer electrolyte formed according to the present disclosure has an excellent ion conductivity of $1.0 \times 10^{-3}$ S/cm to $5.0 \times 10^{-3}$ S/cm at room temperature (see FIG. 3).

In an embodiment of the present disclosure, a polymer used in the gel polymer may be polyvinylidene fluoride (PVdF)-based polymers or copolymers thereof, polyurethane (PU)-based polymers or copolymers thereof, polyethylene (PE)-based polymers or copolymers thereof, poly(vinylidenefluorideco-trifluoroethylene)-based polymers or copolymers thereof, polyethylene glycol (PEO)-based polymers or copolymers thereof, polyacrylonitrile (PAN)-based polymers or copolymers thereof, poly(methylmethacrylate) (PMMA)-based polymers or copolymers thereof, polyvinyl chloride-based polymers or copolymers thereof, polyvinyl pyrrolidone (PVP)-based polymers or copolymers thereof, polyimide (PI)-based polymers or copolymers thereof, polyethylene (PE)-based polymers or copolymers thereof, polyurethane (PU)-based polymers or copolymers thereof, polypropylene (PP)-based polymers or copolymers thereof, poly(propylene oxide) (PPO)-based polymers or copolymers thereof, poly(ethylene imine) (PEI)-based polymers or copolymers thereof, poly(ethylene sulfide) (PES)-based polymers or copolymers thereof, poly(vinyl acetate) (PVAc)-based polymers or copolymers thereof, poly(ethylenesuccinate) (PESc)-based polymers or copolymers thereof, polyester-based polymers or copolymers thereof, polyamine-based polymers or copolymers thereof, polysulfide-based polymers or copolymers thereof, siloxane-based polymers or copolymers thereof, styrene butadiene rubber (SBR)-based polymers or copolymers thereof, and carboxymethyl cellulose (CMC)-based polymers or copolymers thereof, derivatives thereof, or combinations thereof.

In an embodiment of the present disclosure, the lithium salt of the electrolyte used for the formation of the gel polymer electrolyte may be LiClO4, LiPF4, LiPF6, LiAsF6, LiTFSI, LiCF3SO3, Li[(C2F5)3PF3](LiFAP), Li[B(C2O4)2](LiBOB), Li[N(SO2F)2](LiFSI), LiBeti(LiN[SO2C2F5]2), or combinations thereof. In addition, a gel polymer film may be immersed in an electrolyte using a sodium salt. The sodium salt used in the electrolyte using a sodium salt may be NaClO4, NaPF4, NaPF6, NaAsF6, NaTFSI, NaCF3SO3, Na[(C2F5)3PF3](NaFAP), Na[B(C2O4)2](NaBOB), Na[N(SO2F)2](NaFSI), NaBeti(NaN[SO2C2F5]2), or combinations thereof.

In an embodiment of the present disclosure, as a non-aqueous organic solvent of the electrolyte used for the formation of the gel polymer electrolyte may use a carbonate-based, ester-based, ether-based, ketone-based, alcohol-based solvent, or other polar solvents.

In an embodiment of the present disclosure, the stretchable battery of the present disclosure may include a stretchable exterior material formed using a polymer resin layer for shielding the battery.

As the stretchable exterior material, one or more selected from the group consisting of poly dimethyl siloxane (PDMS)-based polymers or copolymers thereof, polyurethane (PU)-based polymers or copolymers thereof, polyethylene (PE)-based polymers or copolymers thereof, polyvinylidene fluoride (PVdF)-based polymers or copolymers thereof, poly(vinylidenefluorideco-trifluoroethylene)-based polymers or copolymers thereof, polyethylene glycol (PEO)-based polymers or copolymers thereof, polyacrylonitrile (PAN)-based polymers or copolymers thereof, poly(methylmethacrylate) (PMMA)-based polymers or copolymers thereof, polyvinyl chloride-based polymers or copolymers thereof, polyvinyl pyrrolidone (PVP)-based polymers or copolymers thereof, polyimide (PI)-based polymers or copolymers thereof, polyethylene (PE)-based polymers or copolymers thereof, polyurethane (PU)-based polymers or copolymers thereof, polypropylene (PP)-based polymers or copolymers thereof, poly(propylene oxide) (PPO)-based polymers or copolymers thereof, poly(ethylene imine) (PEI)-based polymers or copolymers thereof, poly(ethylene sulfide) (PES)-based polymers or copolymers thereof, poly(vinyl acetate) (PVAc)-based polymers or copolymers thereof, poly(ethylenesuccinate) (PESc)-based polymers or copolymers thereof, polyester-based polymers or copolymers thereof, polyamine-based polymers or copolymers thereof, polysulfide-based polymers or copolymers thereof, siloxane-based polymers or copolymers thereof, styrene butadiene rubber (SBR)-based polymers or copolymers thereof, carboxymethyl cellulose (CMC)-based polymers and copolymers thereof, and derivatives thereof.

Meanwhile, the electrode including the organic polymer active material of the present invention is manufactured through (a) preparing a solution including an organic polymer active material, a carbon-based conductive agent, a polymer binder and a solvent; and (b) applying an electric field to the solution for electro-spinning on a substrate to manufacture a non-woven-type electrode.

As described above, the voltage of the electric field used in the electro-spin method is 10 to 30 kV, preferably, 15 to 20 kV.

In an embodiment of the present invention, a stretchable battery may be manufactured through (c) stacking the non-woven-type electrode, the gel polymer electrolyte and a graphite-containing non-woven-type electrode in order.

In this case, the graphite-containing non-woven-type electrode may also be manufactured by preparing a solution including graphite, a polymer binder and a solvent; and applying an electric field to the solution containing the graphite for electro-spinning on a substrate to manufacture a non-woven-type electrode, and the polymer binder, the solvent, or the like may use the same ones as those used for the manufacture of the organic polymer active material electrode. Meanwhile, the graphite may be included in 50 to 90 wt % based on the total mass of the graphite and the polymer binder.

Hereinafter, preferred embodiments will be suggested to assist the understanding of the present disclosure. The embodiments below are only illustrations of the present disclosure, and it would be apparent to a person skilled in the art that various changes and modifications are possible within the scope and technical range of the present disclosure. Such changes and modifications are included in the claims attached herein.

EXAMPLES

Example 1

Manufacture of a Cathode

Poly[2,3-bis(2,2,6,6-tetramethylpiperidine-N-oxycarbonyl)-norbornene] (PTNB) of a nitroxyl radical structure of Formula 1 below as an organic polymer active material, PVdF-HFP as a polymer binder, and carbon black as a conductive agent were mixed and dissolved in a solvent obtained by mixing N-methyl-2-pyrrolidone and acetone in a ratio of 6:4 to prepare a slurry. In this case, the organic polymer active material, the polymer binder and the conductive agent were mixed in a ratio of 4:4:2. Then, through an electro-spin method using the slurry, a non-woven-type cathode was manufactured.

As described above, the electro-spin method is a process of spinning a fiber like a thread by applying electric field to the polymer mixture solution slurry, and a voltage applied in this embodiment was 18 kV.

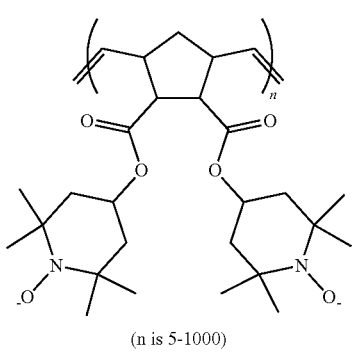

[Formula 1]

(n is 5-1000)

Manufacture of Gel Polymer Electrolyte

A gel polymer electrolyte was formed by immersing a PVdF-HFP polymer film in an electrolyte of 1 M LiPF6 and EC/DMC (50:50 (v/v)).

Manufacture of an Anode

A non-woven-type anode manufactured by mixing 60 wt % of graphite, and 40 wt % of a PVdF-HFP binder and by an electro-spin method, was prepared.

Manufacture of a Battery

Then, a stretchable battery composed of the cathode, anode and polymer electrolyte, thus obtained, was manufactured, and with the battery thus manufactured, electrochemical experiments below were performed.

Example 2

A stretchable battery was manufactured by the same method as in Example 1 except for using poly(2,2,6,6-tetramethylpiperidine-4-yl-1-oxy vinyl ether) (PVTE) of a nitroxyl radical structure as the organic polymer active material, graphene as the conductive agent, and 1 M LiPF6 in EC/DMC/EMC (1:1:1, v/v/v) as the liquid electrolyte for immersing the gel polymer electrolyte.

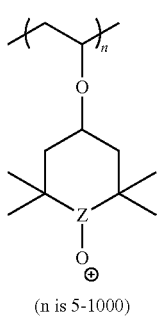

[Formula 2]

(n is 5-1000)

Example 3

A stretchable battery was manufactured by the same method as in Example 1 except for preparing a slurry by mixing 60 wt % of polyimide (PI) of a conjugated carbonyl structure of Formula 3 below as the organic polymer active material, 20 wt % of PVdF as the binder, and 20 wt % of carbon black as the conductive agent, and using a non-woven-type anode composed of 60 wt % of graphite, 30 wt % of a PVdF-HFP binder and 10 wt % of carbon black, as the anode.

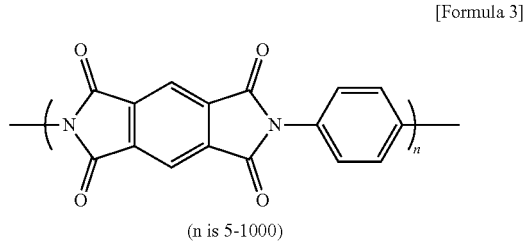

[Formula 3]

(n is 5-1000)

Example 4

A stretchable battery was manufactured by the same method as in Example 1 except for preparing a slurry by mixing 60 wt % of di-lithium terephthalate (DLT) of a conjugated carbonyl structure of Formula 4 below as the organic polymer active material, 20 wt % of PVdF as the binder, and 20 wt % of carbon black as the conductive agent, and using a non-woven-type anode composed of 60 wt % of graphite, 30 wt % of a PVdF-HFP binder and 10 wt % of carbon black, as the anode.

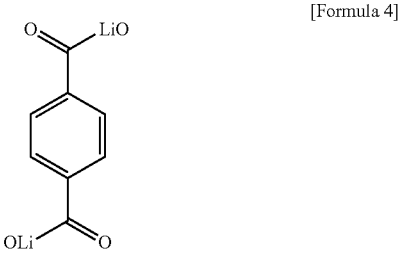

[Formula 4]

Comparative Example 1

Poly[2,3-bis(2,2,6,6-tetramethylpiperidine-N-oxycarbonyl)-norbornene] (PTNB) of a nitroxyl radical structure of Formula 1 as an organic polymer active material, PVdF-HFP as a polymer binder, and carbon black as a conductive agent were mixed and dissolved in a solvent obtained by mixing N-methyl-2-pyrrolidone and acetone in a ratio of 6:4 to prepare a slurry. In this case, the organic polymer active material, the polymer binder and the conductive agent were mixed in a ratio of 4:4:2. Then, the slurry was applied on a current collector (cathode was an Al foil) to a constant thickness using a blade.

Comparative Examples 2 to 4

Electrodes were manufactured by the same method as in Examples 2 to 4 except for preparing slurries using the organic polymer active materials of Examples 2 to 4, the binder and the conductive agent, and applying the slurries on a current collector (cathode was an Al foil) to a constant thickness using a blade.

Hereinafter, experiments on the rate-capability and cycleability of the batteries of the Examples and Comparative Examples were conducted, and the experimental results obtained are shown. The electrodes of the Examples were stretchable due to the non-woven-type electrodes, and charging and discharging were performed in a stretched state by 10% through a stretcher. For reference, the C-rate is a current unit representing a charging and discharging rate and is calculated as the current/rated capacity of battery. That is, the higher C-rate means the shorter charging and discharging time (fast charging and discharging).

As shown below, though electrochemical experiments were performed in a stretched state of the battery, it could be confirmed that the stretchable batteries of the present disclosure maintained electrochemical properties well when compared to the batteries manufactured by the conventional method. It is thought that the effects were shown, because the non-woven-type electrode was employed, stress applied during bending or folding the electrode could be effectively dispersed, and a three-dimensionally well-developed electricity transfer path and an even broader surface area of the electrode could be secured.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| 0.1 C-rate reversible capacity (mAh/g) | 112 | 131 | 350 | 230 | 109 | 110 | 351 | 157 |
| 1 C-rate reversible capacity (mAh/g) | 112 | 120 | 354 | 115 | 90 | 85 | 313 | 80 |
| 50 cycle retention | 95.7% | 95.4% | 84.8% | 94.2% | 88% | 87.5% | 82% | 79% |

The effects of the stretchable battery of the present disclosure are as follows.

The stretchable battery having the configuration of the present disclosure improves the stretching and shrinking properties which are the defects of the conventional secondary battery electrode and at the same time, stably improves electrochemical properties, and may maintain excellent electrochemical properties in the stretched and shrunk states of the electrode.

The stretchable battery having the configuration of the present disclosure employs a non-woven-type electrode and may effectively disperse stress applied during bending or folding the electrode, and accordingly, rate-capability during bending and stretching of the electrode are excellent.

The stretchable battery having the configuration of the present disclosure employs a non-woven-type electrode configuration, and a three-dimensionally well-developed electricity transfer path and an even broader electrode surface area could be secured, thereby securing favorable electrochemical properties.

Although the embodiments have been described with reference to the specific embodiments, they are not limited thereto. The scope of the present invention is shown by the claims below, and it will be readily understood by those skilled in the art that various modifications and changes can be made thereto without departing from the spirit and scope of the present invention defined by the appended claims.

What is claimed is:

1. A stretchable battery, comprising:
an electrode and
a gel polymer electrolyte,
wherein the electrode comprises an organic polymer active material in a form of non-woven fabric in which fibers of the organic polymer active material are crossed; wherein the fibers of the organic polymer active material perform an electrochemical oxidation-reduction reaction; wherein the battery is stretchable; and wherein the gel polymer electrolyte has an ion conductivity of $1.0 \times 10^{-3}$ S/cm to $5.0 \times 10^{-3}$ S/cm at room temperature.

2. The stretchable battery of claim 1, wherein the organic polymer active material is a conductive polymer.

3. The stretchable battery of claim 1, wherein the organic polymer active material is one or more selected from the group consisting of organic polymers having a structure of conjugated hydrocarbon, conjugated amine, conjugated thioether, organodisulfide, thioether, nitroxyl radical, conjugated carbonyl, sulfonyloxy radical and quinone, and derivatives thereof.

4. The stretchable battery of claim 1, wherein the organic polymer active material is comprised in 40 to 80 wt % based on a total weight of the electrode.

5. The stretchable battery of claim 1, wherein the electrode further comprises a polymer binder and the non-woven fabric comprises a carbon conductive agent.

6. The stretchable battery of claim 5, wherein the polymer binder is one or more selected from the group consisting of polyvinylidene fluoride (PVdF)-based polymers or copolymers thereof, polyurethane (PU)-based polymers or copolymers thereof, polyethylene (PE)-based polymers or copolymers thereof, poly(vinylidenefluorideco-trifluoroethylene)-based polymers or copolymers thereof, polyethylene glycol (PEO)-based polymers or copolymers thereof, polyacrylonitrile (PAN)-based polymers or copolymers thereof, poly(methylmethacrylate) (PMMA)-based polymers or copolymers thereof, polyvinyl chloride-based polymers or copolymers thereof, polyvinyl pyrrolidone (PVP)-based polymers or copolymers thereof, polyimide (PI)-based polymers or copolymers thereof, polyethylene (PE)-based polymers or copolymers thereof, polyurethane (PU)-based polymers or copolymers thereof, polypropylene (PP)-based polymers or copolymers thereof, poly(propylene oxide) (PPO)-based polymers or copolymers thereof, poly(ethylene imine) (PEI)-based polymers or copolymers thereof, poly (ethylene sulfide) (PES)-based polymers or copolymers thereof, poly(vinyl acetate) (PVAc)-based polymers or copolymers thereof, poly(ethylenesuccinate) (PESc)-based polymers or copolymers thereof, polyester-based polymers or copolymers thereof, polyamine-based polymers or copolymers thereof, polysulfide-based polymers or copolymers thereof, siloxane-based polymers or copolymers thereof, styrene butadiene rubber (SBR)-based polymers or copolymers thereof, carboxymethyl cellulose (CMC)-based polymers or copolymers thereof, and derivatives thereof.

7. The stretchable battery of claim 5, wherein the carbon conductive agent is one or more selected from the group consisting of active carbon, graphene, carbon nanotube, acetylene carbon black, amorphous carbon, natural graphite, synthetic graphite, carbon black, ketjen black, and vapor-grown carbon fiber (VGCF).

8. The stretchable battery of claim 1, wherein a polymer of the gel polymer electrolyte is one or more selected from the group consisting of polyvinylidene fluoride (PVdF)-based polymers or copolymers thereof, polyurethane (PU)-based polymers or copolymers thereof, polyethylene (PE)-based polymers or copolymers thereof, poly(vinylidenefluorideco-trifluoroethylene)-based polymers or copolymers thereof, polyethylene glycol (PEO)-based polymers or copolymers thereof, polyacrylonitrile (PAN)-based polymers or copolymers thereof, poly(methylmethacrylate) (PMMA)-based polymers or copolymers thereof, polyvinyl chloride-based polymers or copolymers thereof, polyvinyl pyrrolidone (PVP)-based polymers or copolymers thereof, polyimide (PI)-based polymers or copolymers thereof, polyethylene (PE)-based polymers or copolymers thereof, polyurethane (PU)-based polymers or copolymers thereof, polypropylene (PP)-based polymers or copolymers thereof, poly(propylene oxide) (PPO)-based polymers or copolymers thereof, poly(ethylene imine) (PEI)-based polymers or copolymers thereof, poly(ethylene sulfide) (PES)-based polymers or copolymers thereof, poly(vinyl acetate) (PVAc)-based polymers or copolymers thereof, poly(ethylenesuccinate) (PESc)-based polymers or copolymers thereof, polyester-based polymers or copolymers thereof, polyamine-based polymers or copolymers thereof, polysulfide-based polymers or copolymers thereof, siloxane-based polymers or copolymers thereof, styrene butadiene rubber (SBR)-based polymers or copolymers thereof, carboxymethyl cellulose (CMC)-based polymers or copolymers thereof, and derivatives thereof.

9. The stretchable battery of claim 1, wherein the stretchable battery further comprises a stretchable exterior material containing a polymer resin layer for shielding the battery.

10. The stretchable battery of claim 9, wherein the stretchable exterior material is one or more selected from the group consisting of polydimethylsiloxane (PDMS)-based polymers or copolymers thereof, polyurethane (PU)-based polymers or copolymers thereof, polyethylene (PE)-based polymers or copolymers thereof, polyvinylidene fluoride (PVdF)-based polymers or copolymers thereof, poly(vinylidenefluorideco-trifluoroethylene)-based polymers or copolymers thereof, polyethylene glycol (PEO)-based polymers or copolymers thereof, polyacrylonitrile (PAN)-based polymers or copolymers thereof, poly(methylmethacrylate) (PMMA)-based polymers or copolymers thereof, polyvinyl chloride-based polymers or copolymers thereof, polyvinyl pyrrolidone (PVP)-based polymers or copolymers thereof, polyimide (PI)-based polymers or copolymers thereof, polyethylene (PE)-based polymers or copolymers thereof, polyurethane (PU)-based polymers or copolymers thereof, polypropylene (PP)-based polymers or copolymers thereof, poly(propylene oxide) (PPO)-based polymers or copolymers thereof, poly(ethylene imine) (PEI)-based polymers or copolymers thereof, poly(ethylene sulfide) (PES)-based polymers or copolymers thereof, poly(vinyl acetate) (PVAc)-based polymers or copolymers thereof, poly(ethylenesuccinate) (PESc)-based polymers or copolymers thereof, polyester-based polymers or copolymers thereof, polyamine-based polymers or copolymers thereof, polysulfide-based polymers or copolymers thereof, siloxane-based polymers or copolymers thereof, styrene butadiene rubber (SBR)-based polymers or copolymers thereof, carboxymethyl cellulose (CMC)-based polymers or copolymers thereof, and derivatives thereof.

\* \* \* \* \*